July 29, 1941.  G. LEWINSKI  2,250,805
BICYCLE
Filed May 15, 1939     2 Sheets-Sheet 1

INVENTOR.
GEORGE LEWINSKI
BY
ATTORNEYS

July 29, 1941.  G. LEWINSKI  2,250,805
BICYCLE
Filed May 15, 1939  2 Sheets-Sheet 2
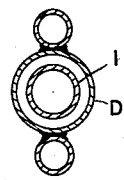
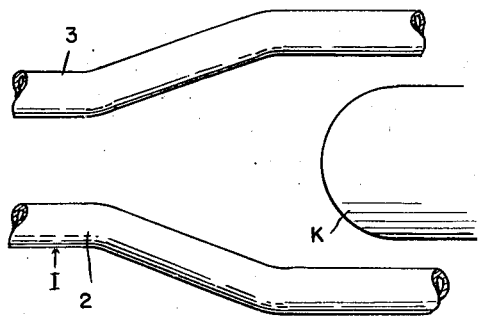
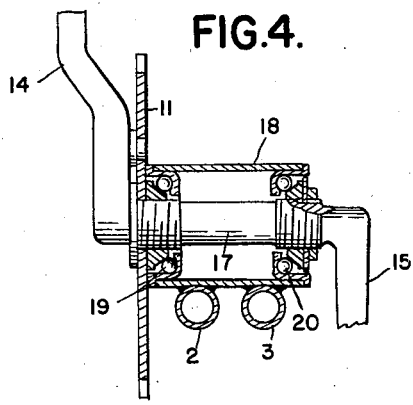
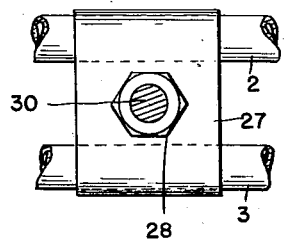
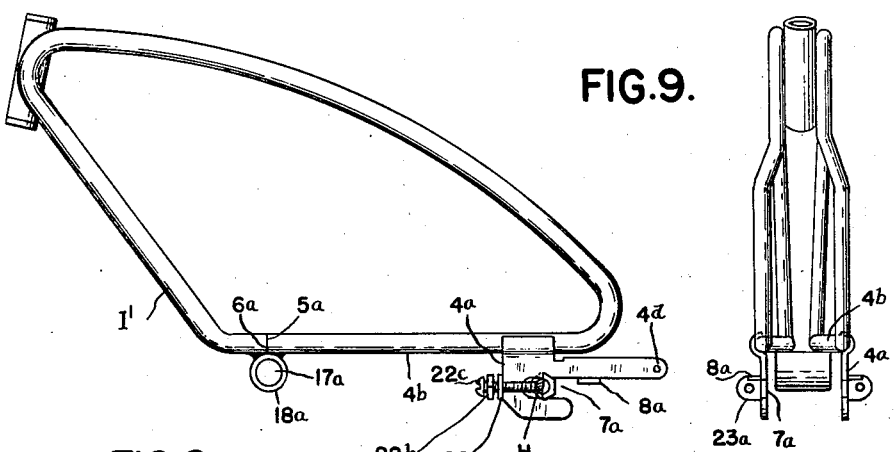
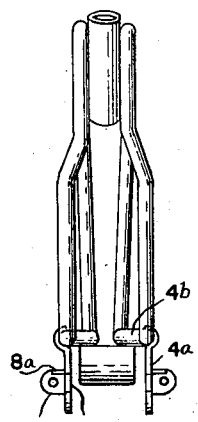
INVENTOR.
GEORGE LEWINSKI
BY
ATTORNEYS Patented July 29, 1941

2,250,805

UNITED STATES PATENT OFFICE 2,250,805

BICYCLE

George Lewinski, Toledo, Ohio, assignor, by mesne assignments, to the Hettrick Manufacturing Company, Toledo, Ohio, a corporation of Ohio Application May 15, 1939, Serial No. 273,751

3 Claims. (Cl. 280—288)

This invention relates generally to bicycles and refers more particularly to the frame constructions thereof.

Heretofore it has been customary in the manufacture of bicycles to build up the frames therefrom a number of separate parts and to connect together such parts by suitable fittings or couplings. All this required many different forming operations and additional time and labor for assembling purposes.

In the present instance the fittings and couplings referred to have been dispensed with entirely and I have provided in place thereof an improved frame structure that comprises a minimum of parts; that can be more economically manufactured; that is strong and durable; and that is pleasing in appearance.

In the accompanying drawings:

Figure 2 is a sectional view taken substantially on the line 2—2 of Figure 1;

Figure 4 is a sectional view taken substantially on the line 4—4 of Figure 1;

Figure 6 is a fragmentary top plan view of the structure illustrated in Figure 1;

Figure 7 is a sectional view taken substantially on the line 7—7 of Figure 1;

Figure 8 is a side elevation of a slight modification;

Figure 9 is a rear end view of the structure shown in Figure 8.

Figure 1:
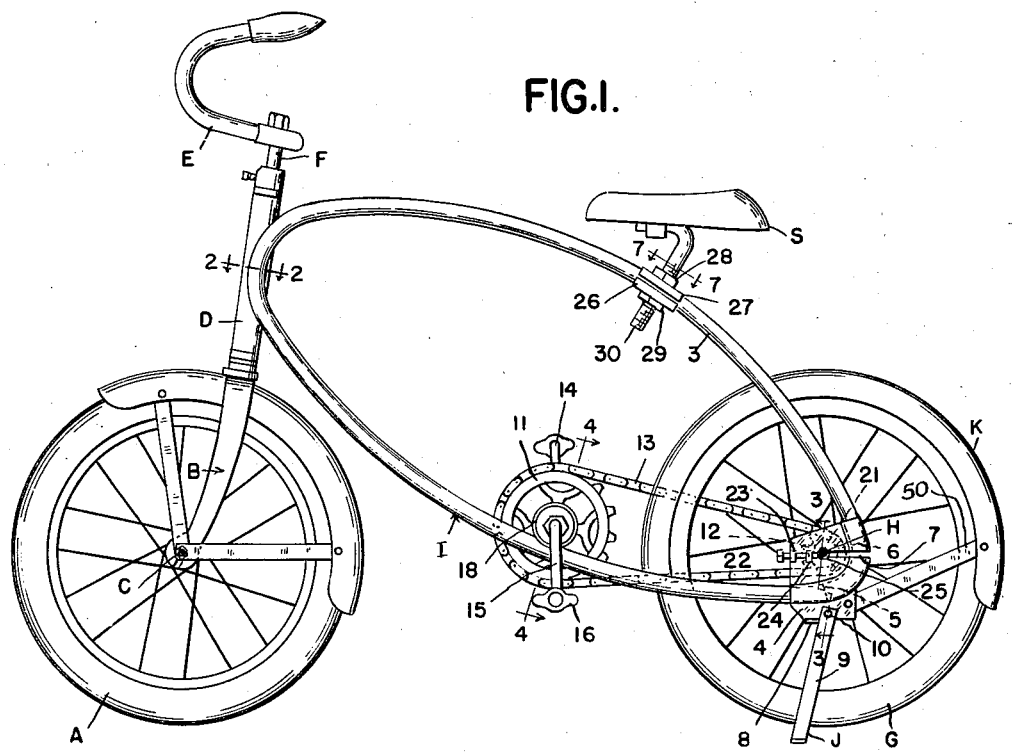
Figure 1 is a side elevation of a bicycle embodying my invention.
Figure 5:
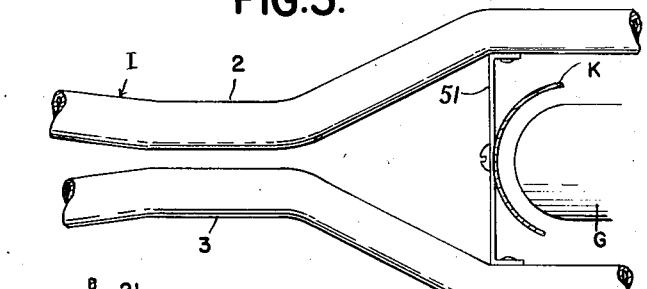
Figure 5 is a fragmentary bottom plan view of the structure illustrated in Figure 1.
Figure 3:
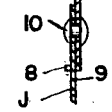
Figure 3 is a sectional view taken substantially on the line 3—3 of Figure 1.

Referring now to the drawings, A is the front ground wheel, B is a steering fork straddling said wheel and having an upstanding tubular shank 1, and C is an axle for said wheel journaled in the furcations of the fork B.

D is a tubular head receiving and forming a housing for the upstanding shank 1, and E is a handlebar above the head and having a depending stem F fitting within and non-rotatably secured to the shank 1.

G is the rear ground wheel, and H is an axle therefor.

I is the frame embodying my invention extending between the head D and axle H and preferably comprising a pair of laterally spaced substantially eliptical members 2 and 3, respectively. Preferably each of said members 2 and 3 comprises a single length of tubing and a pressed metal plate such as 4. As shown, each length of tubing is secured intermediate its ends, preferably by welding operations to the head D, while the ends 5 and 6 of each length of tubing are adjacent the axle H and are spaced slightly apart to permit movement of said axle therebetween. The plates 4 span the spaces between the ends 5 and 6 of the tubing and are rigidly secured to the outer sides of said tubing. Located in the plates 4 between the spaced ends of the tubing are aligned, rearwardly opening slots 7 that receive the axle H, while projecting laterally outward from the plates at the lower edges thereof are lugs 8 that serve as stops for the arms 9 of a suitable stand J for the rear end of the bicycle. Such stand J may, of course, be any suitable construction and the arms 9 thereof may be connected in any suitable manner to the plates 4 as, for example, by the pivots 10. A suitable mud guard K for the rear wheel G is also supported by a brace 50 from the plates 4 and a tie bar 51 extending between and terminally secured to the members 2 and 3 of the frame.

The propelling mechanism for the bicycle preferably comprises sprockets 11 and 12, respectively, a connecting chain 13, and cranks 14 and 15 provided with suitable pedals such as 16. As shown, the sprocket 11 is fixed to a shaft 17 journaled in a hanger 18, and the cranks 14 and 15 are fixed to opposite ends of said shaft. The hanger 18 is fixed, preferably by welding or brazing operations, to the members 2 and 3 of the frame and contains suitable ball races 19 and 20 for the shaft 17. The sprocket 12 is fixed to the wheel hub 21 between the plates 4. The chain 13 is trained about the sprockets 11 and 12 and may be any suitable construction.

22 are adjusting bolts threadedly engaging lugs 23 and 24, respectively, on the plates 4 and bearing against nuts 25 on the axle H to take up slack in the chain 13.

The saddle S is supported upon the members 2 and 3 of the frame by cooperating clamps 26 and 27 and adjusting nuts 28 and 29. As shown, the supporting post 30 for the saddle engages aligned holes in the clamps 26 and 27 and is exteriorly threaded at its lower end for engagement with the nuts 28 and 29. By adjusting the nuts 28 and 29, the post 30 may be turned to position the seat or saddle S at the proper elevation relative to the frame, and the clamps 26 and 27 may be adjusted longitudinally of the members 2 and 3 of the frame, as desired, to position the saddle S at the proper point relative to the handlebars E and propelling mechanism of the bicycle.

In Figures 8 and 9 I have illustrated a slight modification in which the ends 5a and 6a of each length of tubing forming the frame I' are welded together and are just above and welded to the hanger 18a for the sprocket shaft 17a. As shown, the side elevational contour or curvature of the frame I' is slightly different than that of the frame I, and the plates 4a are suspended from the lower portions 4b of the tubing instead of secured to the ends 5 and 6 thereof as in Figure 1. Preferably the plates 4a are welded to the outer sides of the portions 4b of the tubing and have horizontal rearwardly opening slots 7a for the rear axle H. The elongated portion 4c of each plate above the slots 7a is provided at its rear end with an opening 4d for a suitable fastening element (not shown) for a brace such as that shown in Figure 1 for the mud guard K, and is provided intermediate its ends with a lug 8a that serves as a stop for the arms 9 of the stand J. Projecting laterally from each plate 4a at its forward end in alignment with the slot 7a is a lug 3 carrying an adjusting bolt 22a for the rear axle H' to take up slack in a chain such as 13. If desired adjusting nuts 22b may be provided on the bolts 22a between the heads 22c of such bolts and the lugs 23a. Thus, with this construction the function and operation of parts are substantially the same as that set forth in Figures 1 to 7, inclusive.

What I claim as my invention is:

1. In a bicycle, a load carrying frame comprising a pair of laterally spaced elongated open loops, each consisting of a single length of tubing having opposite ends thereof at the rear end of the frame and spaced vertically apart to provide a substantially horizontal slot, the horizontal slots being in lateral alignment and of sufficient depth to permit an axle to pass therethrough between the ends of the tubing into the space within said loops, and means for supporting the axle within said loops including plates having portions substantially conforming in curvature and secured in surface-to-surface relation to upright sides of the tubing above and below said laterally aligned slots and having inwardly offset substantially parallel upright portions within said loops provided with laterally aligned rearwardly openings slots registering with and forming forward extensions of the slots between the spaced ends of the tubing for receiving the axle aforesaid, said inwardly offset parallel upright portions resting upon and secured to adjacent top portions of said tubing below the first mentioned slots.

2. In a bicycle, a load carrying frame comprising a pair of laterally spaced elongated open loops, each consisting of a single length of tubing having opposite ends thereof at the rear end of the frame and spaced vertically apart to provide a substantially horizontal slot, the horizontal slots being in lateral alignment and of sufficient depth to permit an axle to pass therethrough between the ends of the tubing into the space within said loops, and means for supporting the axle within said loops including sheet metal stampings having portions secured to upright sides of the tubing above and below said laterally aligned slots and having inwardly offset substantially parallel upright portions within said loops provided with laterally aligned rearwardly opening slots registering with and forming forward extensions of the slots between the spaced ends of the tubing for receiving the axle aforesaid, the inwardly offset upright portions resting upon and supported by adjacent top portions of said tubing below the first mentioned slots.

3. In a bicycle, a load carrying frame comprising a pair of laterally spaced elongated open loops, each consisting of a single length of tubing having opposite ends thereof at the rear end of the frame and spaced vertically apart to provide a substantially horizontal slot, the horizontal slots being in lateral alignment and of sufficient depth to permit an axle to pass therethrough between the ends of the tubing into the space within said loops, and means for supporting the axle within said loops including plates having portions secured to upright sides of the tubing above and below said laterally aligned slots and having inwardly offset substantially parallel upright portions inside and outside said loops, the parallel portions inside said loops being provided with laterally aligned rearwardly opening slots registering with and forming forward extensions of the slots between the spaced ends of the tubing for receiving the axle aforesaid, the offset upright portions within said loops resting upon and supported by adjacent top portions of the tubing below the first mentioned slots, the inwardly offset upright portions outside said loops being substantially in vertical alignment with the offset portions inside the loops and apertured to receive fastening means for a fender brace and for a stand for the bicycle.

GEORGE LEWINSKI.